United States Patent Office.

FREDERICK W. SCHROEDER, OF NEW YORK, N. Y., ASSIGNOR OF ONE-HALF TO FERDINAND W. ROEBLING, OF TRENTON, NEW JERSEY.

INSULATING COMPOSITION OR COMPOUND FOR COATING ELECTRIC AND OTHER WIRES OR CONDUCTORS.

SPECIFICATION forming part of Letters Patent No. 251,474, dated December 27, 1881.

Application filed October 21, 1881. (No specimens.)

*To all whom it may concern:*

Be it known that I, FREDERICK W. SCHROEDER, of the city of New York, in the county and State of New York, have invented a new and useful Insulating Composition or Compound for Coating Electric and other Wires or Conductors, which invention is fully set forth in the following specification.

The object of this invention is to provide the conducting wires, rods, or cables for telegraphs, telephones, electric lights, and all similar purposes with a coating that shall be weather-proof and water-proof, as well as an efficient insulator or non-conductor of electricity.

Following are enumerated certain ingredients used in the manufacture of this composition, their manipulation and method of treatment being also fully set forth, namely: glue, gum-mastic, dextrine, chrome-alum, chloride of iron, albumen, and glycerine. Said ingredients, in about the several proportions below mentioned, are treated as follows: Two pounds of glue, preferably of the best quality, are first dissolved in one pound and a half of warm water in a suitable vessel set in a water bath heated not above the boiling-point. Then sixteen ounces of gum-mastic are dissolved in thirty-two ounces of alcohol, and fourteen ounces of dextrine in twenty-four ounces of alcohol, each of said gums, after thorough dissolution in the alcohol, being poured into and well mixed and stirred with the glue. To the above mixture are then added two and one-half ounces of chrome-alum dissolved in eight ounces of glycerine, and also one-fourth of an ounce of chloride of iron dissolved in fourteen ounces of water. To the mixture constituted as above described is added, lastly, from eight to twenty ounces of albumen thoroughly incorporated with from two to eight ounces of glycerine. The whole mixture is then carefully stirred until all the ingredients are thoroughly incorporated, care being taken that the mixture shall not boil or reach its normal temperature of ebullition at atmospheric pressure. The alcohol and water are used merely as menstrua or vehicles for the solids dissolved therein and being evaporated or driven off in the process or treatment. Any suitable solvents may be substituted therefor.

The composition may be kept for an indefinite time in a melted or plastic state, but must not be allowed to set by cooling.

While in its warm plastic condition the composition is applied to the wire or other article to be coated, machinery of suitable character being used for this purpose, by which the coating as applied is subjected to great pressure.

The composition thus made and applied forms a thoroughly insulating coat, impervious to the atmosphere and to either fresh or salt water, and conductors coated therewith may be laid in the earth without other protection, the composition, while under ground, being indestructible except by cutting or abrading forces.

In place of the mastic, either gum-arabic or the gum of the cherry-tree may be substituted, and any suitable pigments or coloring matter may be added, if desired, to the ingredients above mentioned.

The quantities of the materials herein noted are those which experience has determined to be attended with the most satisfactory results. I do not, however, confine myself to the precise quantities or proportions noted, as the proportions may be varied, particularly in the case of the albumen. The greater the exposure to the weather or to salt-water the larger should be the proportion of albumen used. The albumen may, however, be omitted without destroying the insulating character of the composition.

As of my invention, I claim—

An insulating composition for coating or covering electric and other wires or conductors, consisting of glue, mastic, dextrine, chrome-alum, chloride of iron, and glycerine, said ingredients being proportioned and treated either with or without the addition of albumen, substantially as and for the purposes set forth.

FREDERICK WILLIAM SCHROEDER.

Witnesses:
D. H. KENAGA,
G. A. CLEMENT.